US012035210B1

(12) United States Patent
Shipman, Jr. et al.

(10) Patent No.: US 12,035,210 B1
(45) Date of Patent: Jul. 9, 2024

(54) DAMAGE AND INTRUSION DETECTION SYSTEM (71) Applicant: Tech Friends, Inc., Jonesboro, AR (US)

(72) Inventors: Bobby L. Shipman, Jr., Jonesboro, AR (US); Bobby L. Shipman, III, Jonesboro, AR (US); Mark Haney, Jonesboro, AR (US)

(73) Assignee: TECH FRIENDS, INC., Jonesboro, AR (US)

( * ) Notice: Subject to any disclaimer, the term of this patent is extended or adjusted under 35 U.S.C. 154(b) by 106 days.

(21) Appl. No.: 17/671,433

(22) Filed: Feb. 14, 2022

Related U.S. Application Data (63) Continuation-in-part of application No. 16/897,105, filed on Jun. 9, 2020, which is a continuation-in-part of application No. 16/033,045, filed on Jul. 11, 2018, now Pat. No. 10,678,302, which is a continuation-in-part of application No. 15/136,604, filed on Apr. 22, 2016, now Pat. No. 10,225,734, which is a continuation-in-part of application No. 14/923,271, filed on Oct. 26, 2015, now Pat. No. 10,256,645, which is a continuation-in-part of application No. 14/869,592, filed on Sep. 29, 2015, now Pat. No. 9,917,455.

(51) Int. Cl.
H04W 4/38 (2018.01)
H04W 4/80 (2018.01)

(52) U.S. Cl.
CPC ............... H04W 4/38 (2018.02); H04W 4/80 (2018.02)

(58) Field of Classification Search
CPC .................................. H04W 4/38; H04W 4/80
See application file for complete search history.

(56) References Cited

U.S. PATENT DOCUMENTS

| 5,886,634 | A | * | 3/1999 | Muhme | G08B 13/2454 340/5.31 |
| 7,236,809 | B2 | * | 6/2007 | Fischedick | H04M 1/727 455/343.1 |
| 9,495,851 | B1 | * | 11/2016 | Russell | G06Q 30/0635 |
| 10,524,368 | B1 | * | 12/2019 | Betancourt | G07C 9/28 |
| 11,625,506 | B1 | * | 4/2023 | Smith | H05K 5/0247 726/34 |
| 2004/0080477 | A1 | * | 4/2004 | Capurso | G06K 17/0022 345/87 |

(Continued)

FOREIGN PATENT DOCUMENTS

JP 2006267051 A * 10/2006

Primary Examiner — Chico A Foxx
(74) Attorney, Agent, or Firm — Schrantz Law Firm, PLLC; Stephen D. Schrantz (57) ABSTRACT The system detects damage and tampering of electronic devices, including tablets. A damage detector secured to the tablet provides a detection circuit. The system detects damage to the device/tablet by determining if the detection circuit is broken or otherwise interrupted. A broken or interrupted detection circuit indicates that the electronic device has been damaged or otherwise tampered with. A damage reader is installed within a base that accepts the device. The damage reader checks if the detection circuit is complete and determines if all of the RFID tags associated with a tablet can be read. If the damage reader fails to detect any of the damage detectors, the system indicates that the device/tablet is damaged.

13 Claims, 11 Drawing Sheets (56) References Cited

U.S. PATENT DOCUMENTS

| | | | | |
|---|---|---|---|---|
| 2005/0088286 A1* | 4/2005 | Heinrich | ............... | G08C 17/02 |
| | | | | 340/10.51 |
| 2005/0162277 A1* | 7/2005 | Teplitxky | ............... | B65D 55/06 |
| | | | | 340/572.7 |
| 2005/0242957 A1* | 11/2005 | Lindsay | ............ | G06K 19/0716 |
| | | | | 343/893 |
| 2006/0255953 A1* | 11/2006 | Lyon | ............... | G06K 19/07749 |
| | | | | 340/572.8 |
| 2009/0089111 A1* | 4/2009 | Walker | ................. | G06Q 30/02 |
| | | | | 705/7.29 |
| 2011/0057788 A1* | 3/2011 | Talkington | ............ | G08B 13/08 |
| | | | | 340/521 |
| 2012/0287095 A1* | 11/2012 | Cote | ..................... | G06Q 10/08 |
| | | | | 345/204 |
| 2014/0049404 A1* | 2/2014 | Rassega | ............. | G01R 22/066 |
| | | | | 340/870.16 |
| 2014/0062787 A1* | 3/2014 | Nazarov | ................ | H01Q 9/285 |
| | | | | 235/492 |
| 2014/0253290 A1* | 9/2014 | Yang | ................. | G06K 7/10188 |
| | | | | 340/10.1 |
| 2015/0029001 A1* | 1/2015 | Pleshek | ................. | G07G 1/009 |
| | | | | 340/10.5 |
| 2015/0278755 A1* | 10/2015 | Danilewitz | ........ | G06K 19/0723 |
| | | | | 705/28 |
| 2016/0379025 A1* | 12/2016 | Profanchik, Sr. | .. | G06K 7/10366 |
| | | | | 340/10.1 |
| 2019/0026753 A1* | 1/2019 | White | ................ | G06K 7/10297 |
| 2019/0097468 A1* | 3/2019 | Kim | ........................ | G06K 7/10 |
| 2019/0213573 A1* | 7/2019 | Zelten | .................. | G06Q 20/407 |
| 2019/0326954 A1* | 10/2019 | Sebastian | ............ | H04B 5/0031 |
| 2019/0333325 A1* | 10/2019 | Shigeta | ................. | G06T 7/0002 |
| 2020/0311742 A1* | 10/2020 | Yeung | ................ | G06K 7/10297 |
| 2021/0027237 A1* | 1/2021 | Klish | ..................... | G07C 1/10 |
| 2022/0374973 A1* | 11/2022 | Fort | ........................ | G07F 17/12 |
| 2022/0398424 A1* | 12/2022 | Forster | ............ | G06K 19/07773 |
| 2022/0398425 A1* | 12/2022 | Roth | ............... | G06K 19/07773 |

* cited by examiner

DAMAGE AND INTRUSION DETECTION SYSTEM

CROSS-REFERENCE TO RELATED APPLICATIONS

This application claims priority to and is a continuation in part of U.S. patent application Ser. No. 16/897,105 entitled "SECURE CHARGING SYSTEM FOR ELECTRONIC DEVICES" that was filed on Jun. 9, 2020 which is a continuation in part of U.S. patent application Ser. No. 16/033,045 entitled "SECURED STORAGE FOR ELECTRONIC DEVICES" that was filed on Jul. 11, 2018 that issued as U.S. Pat. No. 10,678,302 on Jun. 9, 2020, that is a continuation in part of U.S. patent application Ser. No. 15/136,604 entitled "SECURED STORAGE FOR ELECTRONIC DEVICES" that was filed on Apr. 22, 2016 that issued as U.S. Pat. No. 10,225,734 on Mar. 5, 2019, which is a continuation in part of U.S. patent application Ser. No. 14/923,271 entitled "Protective Housing" that was filed on Oct. 26, 2015 that issued as U.S. Pat. No. 10,256,645 on Apr. 9, 2019 which is a continuation in part of U.S. patent application Ser. No. 14/869,592 entitled "Charging Unit and System for at least One Electronic Device" that was filed on Sep. 29, 2015 that issued as U.S. Pat. No. 9,917,455 on Mar. 13, 2018.

STATEMENT REGARDING FEDERALLY SPONSORED RESEARCH OR DEVELOPMENT

Not Applicable.

REFERENCE TO A MICROFICHE APPENDIX

Not Applicable.

RESERVATION OF RIGHTS

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

BACKGROUND OF THE INVENTION

I. Field of the Invention

The present invention relates to a damage detection system and security system for detecting damage and preventing unauthorized access to an electronic device, including but not limited to tablets, smart phones, mobile computing devices, mobile electronic devices, and other electronic devices. One or more damage detectors are secured to the electronic device or a case for the electronic device to provide coverage across the device/table. Each damage detector forms a detection circuit. A broken detection circuit informs the system that the electronic device has been damaged or otherwise tampered with.

The present invention also provides a secured storage system that may be implemented with one or more damage readers that detect the status of the detection circuit. The damage reader reads the damage detector. If the damage reader cannot read the damage detector or all damage detectors, the system identifies the electronic device as a damaged device. Personnel may then inspect the electronic device identified as damaged.

The storage system also provides a charger station for charging the electronic device. In another embodiment, the secured storage system may securely store the electronic device to prevent unauthorized access to the device.

The secured storage provides a lock that locks the device into position. The lock controls access to the device. If the user is granted access, the lock of one embodiment retracts within housing to allow removal of the device from the housing. To secure the device, the lock extends from the housing towards the device. The lock may also secure the device within the housing if the device is damaged.

The charging station of one embodiment is keyed to accept insertion of the device in a particular orientation. The keying of the charging station prevents users from incorrectly inserting the device into the charging station. The keying of the charging system also positions the damage reader with the damage detector to allow the damage reader to determine if the electronic device is damaged. The keying of the charging system also positions the tablet with the base for communication between the base (and a server, computer, computing device, or other computing system) and the tablet.

II. Description of the Known Art

Certain problems exist with the known art. Electronic devices, such as tablets, and known housings for tablets and other electronic devices do not detect damage to the device. Known devices provide unfettered access to the device.

Known electronic devices and housings do not detect damage or other tampering of the device. Known methods of determining damage to an electronic device requires personal inspection. In certain environments, such as controlled environment facilities and schools, users will not inform personnel of a damaged device. Personnel must then examine each device to determine the status of the device.

Therefore, the present invention is needed to provide a unique detection system that detects damage or other tampering to an electronic device. The present invention also charges and secures a device. The present invention securely stores the device to limit other's use of the damaged or tampered device.

SUMMARY OF THE INVENTION

The present invention relates to detecting damage and tampering of electronic devices, including but not limited to, tablets, smart phones, mobile electronic devices, mobile computing devices, and other electronic devices. The mobile computing devices may include, but are not limited to, tablets, smart phones, iPads, iPods, iPhones, Android devices, televisions, DVD playback devices, Raspberry Pi, Arduino device, radios, MP3 players, wearable devices, fitness trackers, digital audio players, and digital media players. The damage detection system detects the damage status of a device without requiring manual inspection of the device. Upon detecting damage or otherwise tampering of the device, the housing of one embodiment locks the device within the base until authorized access by personnel.

The tablet or other electronic device has at least one damage detector secured to the device/tablet. The damage detector of one embodiment is secured to the device or within the device. The damage detector of one embodiment is secured to a case or housing that is secured to the device/tablet. The damage detector includes a detection circuit. The damage detector(s) of one embodiment includes RFID tag(s) secured to the device/tablet in different positions across the device in which the detection circuit is an antenna of the RFID tag. The detection circuit of one embodiment is a circuit between two contacts of the device that extends across the device to provide coverage across the device/tablet.

The system detects damage to the device/tablet by determining if the detection circuit is broken or otherwise interrupted. A broken or interrupted circuit indicates that the electronic device has been damaged or otherwise tampered with. Damage readers checking for a complete detection circuit determine if the device is damaged. The system updates the damage status of a device/tablet based on the reading and detecting the damage detectors. If the damage reader cannot read all damage detectors associated with a device, the system updates the damage status of the device to damaged. If the damage reader reads all damage detectors associated with the device, the system updates the damage status of the device to not damaged.

A damage reader is secured within a base that accepts the device. The base provides multiple receiving apertures for receiving the tablets. In one embodiment, a damage reader is installed for each receiving aperture of the base. In another embodiment, a single damage reader reads multiple receiving apertures or all receiving apertures of the base. Each damage reader reads the damage detector associated with at least one device.

Another embodiment provides damage readers that read the status of the damage detectors outside of the base. In one embodiment, damage readers, such as RFID readers, are installed throughout the facility. These RFID readers check the status of the RFID tags to determine if all RFID tags associated with a device can be found. If the RFID readers cannot find all RFID tags associated with a device, the system indicates that the device is damaged.

In another embodiment, the device, such as a tablet, includes a damage detector such as using the processor or a simple circuit detection to determine if the damage detector provides a complete circuit. Upon detecting a broken circuit, the damage reader indicates that the device is damaged.

In one embodiment, the system generates an alert to indicate the damage has been detected by the damage reader. The alert may be generated by a damage reader detecting damage in the base or outside of the base. The system creates an alert identifying that the device, such as a tablet, is damaged. The alert may be an audible alert, such as an alarm, a visual alert, such as a light, or both audible and visual alert. The alert may also be a message, such as an electronic message, an email, a text message, or other message sent to an electronic device. The message of one embodiment includes the device identifier identifying the device, location of the device, the user associated with the device when the damage occurred, and the amount of damage (such as percentage of damage detectors damaged). The system transmits the message to one or more authorized recipients, including, but not limited to, authorized personnel, officers, the owner of the equipment, correctional officers, facility personnel, IT staff, and other approved recipients.

In one embodiment, the receiving aperture includes data contacts. The data contacts enable communication between the base and the electronic device. The data contacts communicate with the electronic device to transfer data and identify the electronic device. In one embodiment, the damage detector creates a circuit between data contacts of the electronic device. The data contacts of the base determine if the detection circuit is complete. If the detection circuit is incomplete, the base identifies the incomplete circuit between the data contacts of the electronic device and updates the damage status of the device to damaged.

The base may also be implemented with a charger for charging the device. The base simplifies the process of charging the devices by removing the need to insert a plug into the electronic device for charging.

The system of one embodiment provides a housing for the electronic device and a base designed to receive the housing. The charging base is configured to accept the housing in a set orientation. The receiving apertures form a unique shape to allow insertion of the housing into the charging base in an allowed orientation that enables communication between the damage detector and damage reader. The receiving aperture prevents insertion of the housing into the base in a restricted orientation that does not allow communication between the damage detector and damage reader. The allowed orientation also allows charging of the device and communication between the device and the base.

It is an object of the present invention to detect damage to an electronic device, such as a tablet.

It is an object of the present invention to identify damage without requiring manual inspection of an electronic device.

It is an object of the present invention to limit access to a damaged electronic device.

It is an object of the present invention to maintain records to identify when an electronic device is damaged.

It is an object of the present invention to monitor the status of an electronic device to determine the user that had checked the device out before the device was damaged.

It is an object of the present invention to provide a secondary identification of an electronic device.

It is another object of the present invention to reduce the costs associated with maintaining devices.

It is another object of the present invention to reduce problems associated with providing access to an electronic device.

It is another object of the present invention to provide dual identification of an electronic device installed within the base.

These and other objects and advantages of the present invention, along with features of novelty appurtenant thereto, will appear or become apparent by reviewing the following detailed description of the invention.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION

Figure 1:
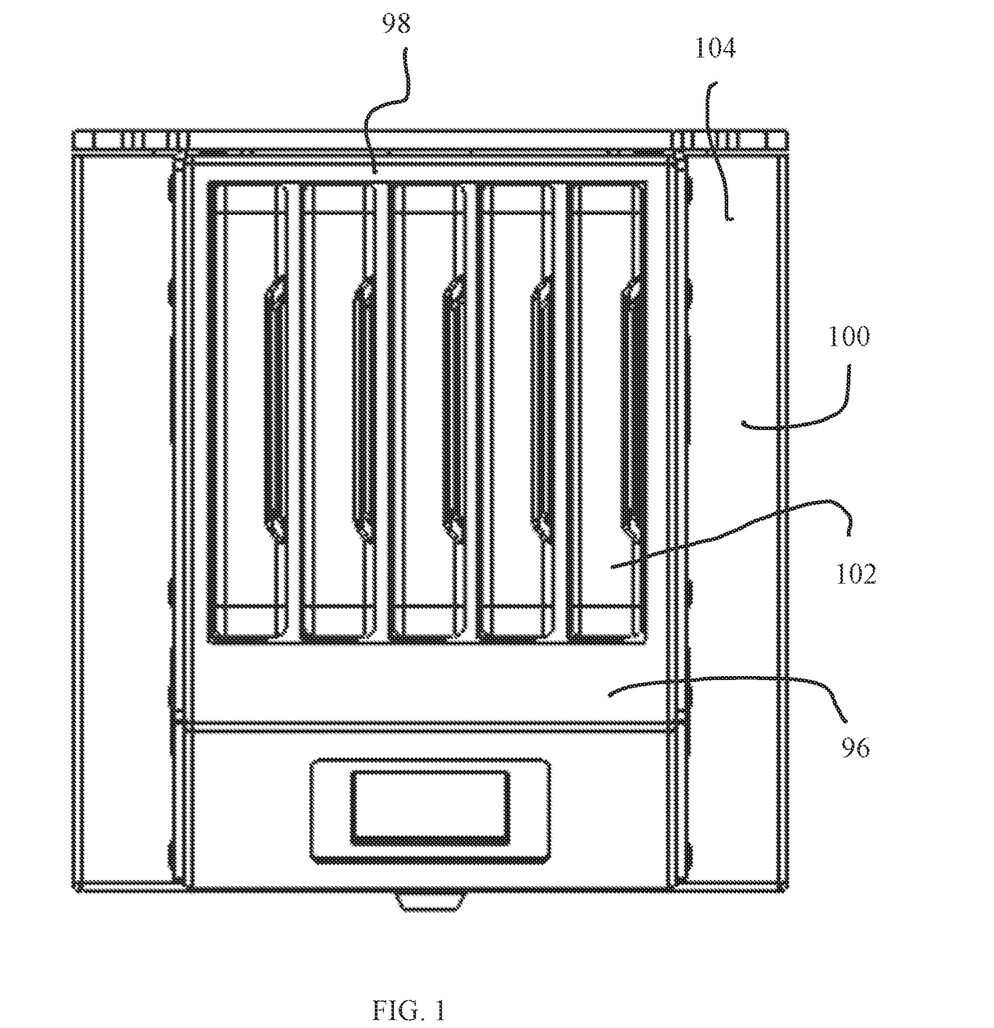
FIG. 1 is a top environmental view of one embodiment of the present invention.

FIG. 1 shows an environmental view of one embodiment of the detection system 100 for an electronic device 102, including but not limited to a mobile computing device or tablet. The detection system 100 provides a base 104 for detecting damaged devices 102 and storing the devices 102.

The base 104 detects damage and tampering of electronic devices 102, including but not limited to, tablets, smart phones, mobile electronic devices, mobile computing devices, and other electronic devices. The electronic devices may include, but are not limited to, tablets, mobile computing devices, smart phones, iPads, iPods, iPhones, Android devices, televisions, DVD playback devices, Raspberry Pi, Arduino device, radios, MP3 players, wearable devices, fitness trackers, digital audio players, and digital media players. The detection system 100 simplifies the process of monitoring the devices 102, determining the status of the devices 102, and detecting damage of the devices 102. The damage detection system detects the status of a device without requiring manual inspection of the device. Upon detecting damage or otherwise tampering of the device 102, the base 104 of one embodiment locks the device 102 within storage until authorized access by personnel.

One or more damage readers installed within the base 104, such as the walls 96, 98 or interior of a receiving aperture of the base 104, read the damage detectors. The damage readers detect damage upon not reading a damage detector. If the damage readers read all damage detectors associated with a device 102, the damage reader indicates no damage to the device 102 and identifies the damage status as not damaged. If the damage reader cannot read all damage detectors associated with a device 102, the damage reader indicates that the device 102 is damaged and identifies the damage status as damaged.

Figure 2:
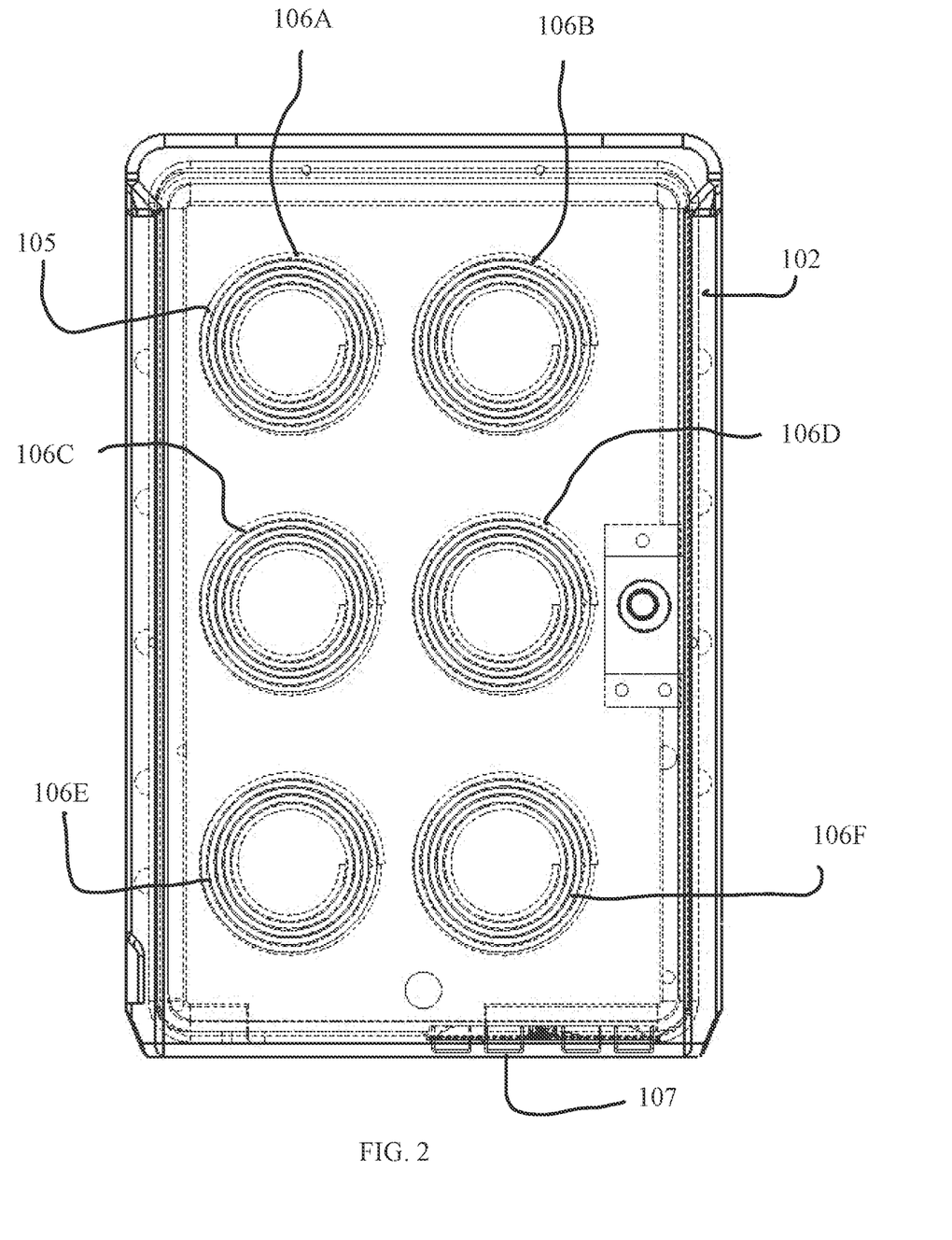
FIG. 2 is a rear sectional view of a tablet of one embodiment of the present invention.
Figure 7:
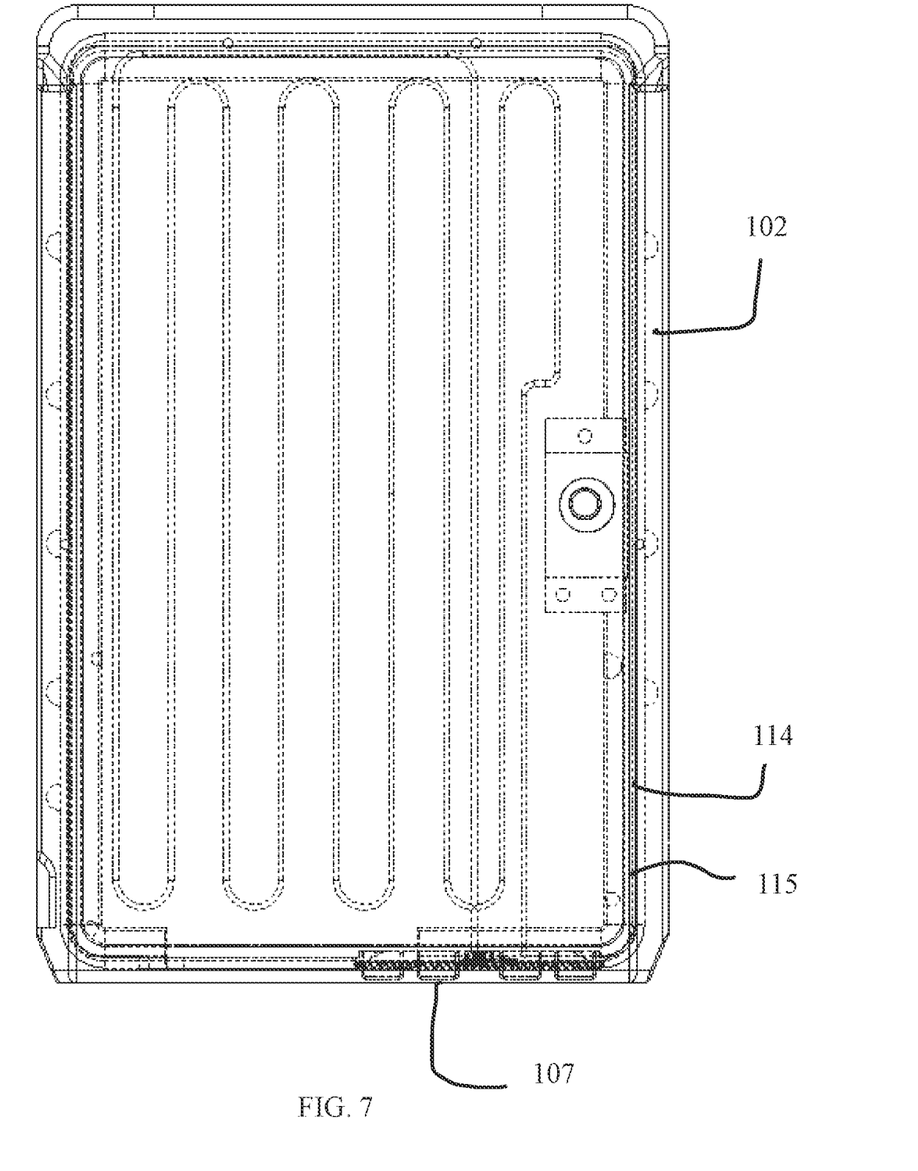
FIG. 7 is a front sectional view thereof.

The tablet or other electronic device 102 provides at least one damage detector, such as damage detectors 106A-106F shown in FIG. 2 or damage detector 114 shown in FIG. 7 installed within the device 102/tablet or a case or housing on the device/tablet. The damage detector 106A-106F, 114 includes a detection circuit 105, 115. One embodiment may provide RFID tags as the damage detector. The detection circuit is the antenna 105 of the RFID tag. The detection circuit 115 of another embodiment is a circuit between two contacts 107 of the device 102 shown in FIG. 7.

The system 100 detects damage to the device 102/tablet by determining if the detection circuit 105, 115 is broken or otherwise interrupted. A broken or interrupted circuit 105, 115 indicates that the electronic device 102 has been damaged or otherwise tampered with. In one embodiment, the damage reader determines if the detection circuit is incomplete by attempting to read the RFIDs associated with the device/tablet.

Figure 3:
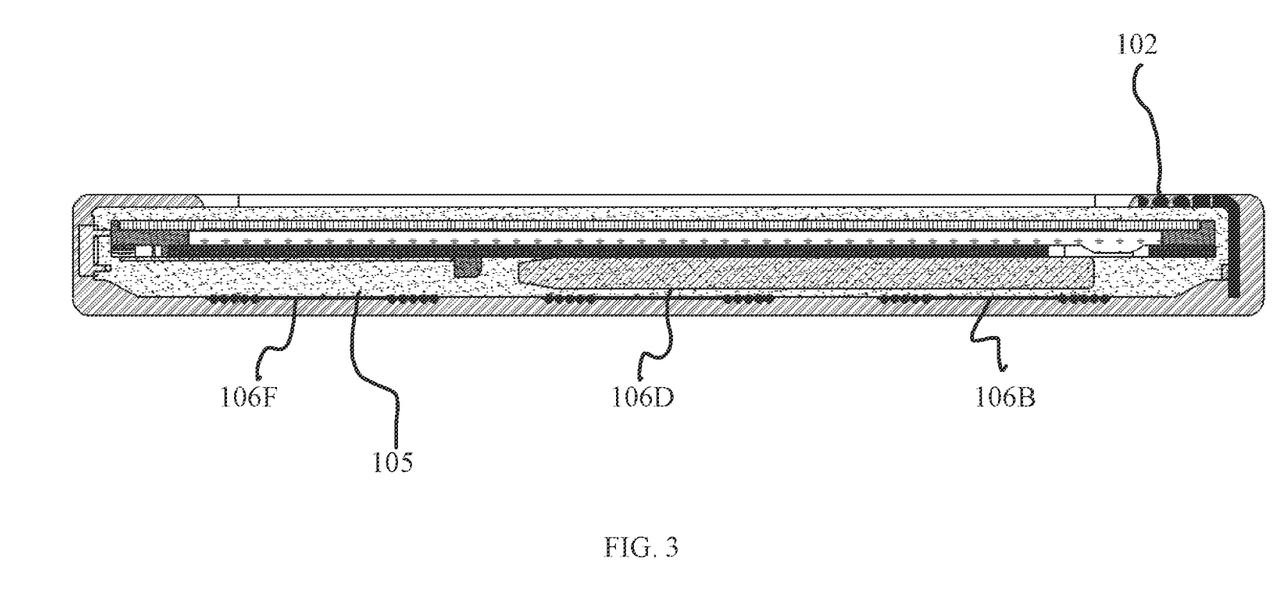
FIG. 3 is a right side sectional view thereof.

FIGS. 2 and 3 show an embodiment in which multiple damage detectors 106A-106F are installed on the electronic device 102, such as the tablet. The damage detectors 106A-106F are positioned throughout the back of the device 102. The positioning of the damage detectors 106A-106F detects damage to different positions of the device 102.

In the embodiment shown in FIGS. 2-3, the damage detectors 106A-106F are RFID tags with antennas serving as the detection circuits 105. A broken detection circuit 105, such as the antenna, of an RFID tag will not transmit the ID associated with the RFID. The damage reader, such as an RFID reader, will not read an RFID tag that has a broken antenna. The RFID reader determines the damage status based on broken antennas of the RFID tags.

The system identifies the damage detectors 106A-106F associated with device 102. The system attempts reading all damage detectors 106A-106F associated with the device 102. If the system detects all damage detectors 106A-106F associated with the device 102, the system indicates that the damage readers have not detected damage for device 102. If the system does not detect all damage readers 106A-106F associated with the device 102, the system indicates that the damage readers have detected damage for device 102.

Figure 4:
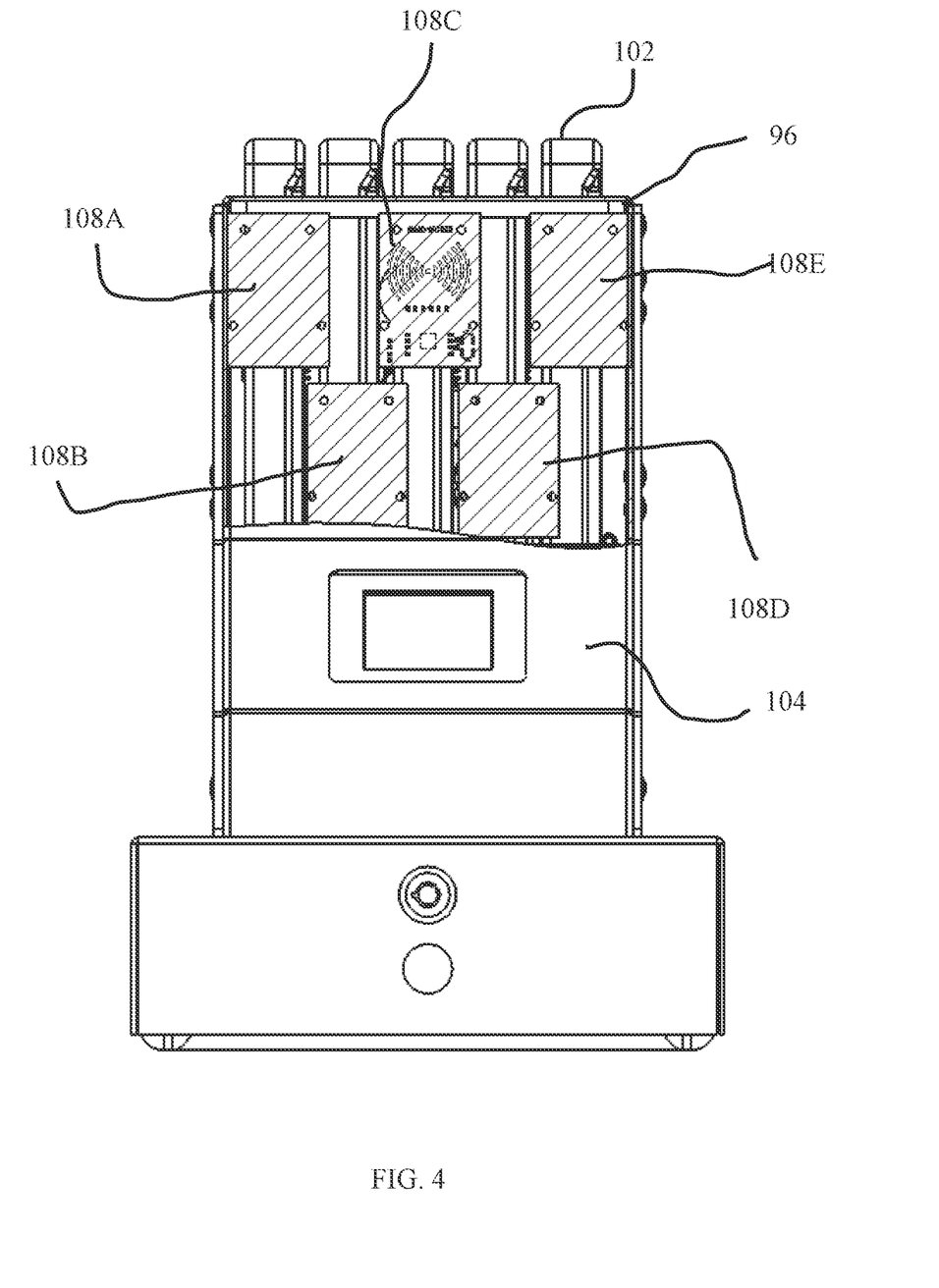
FIG. 4 is a front sectional view of one embodiment of the present invention.
Figure 5:
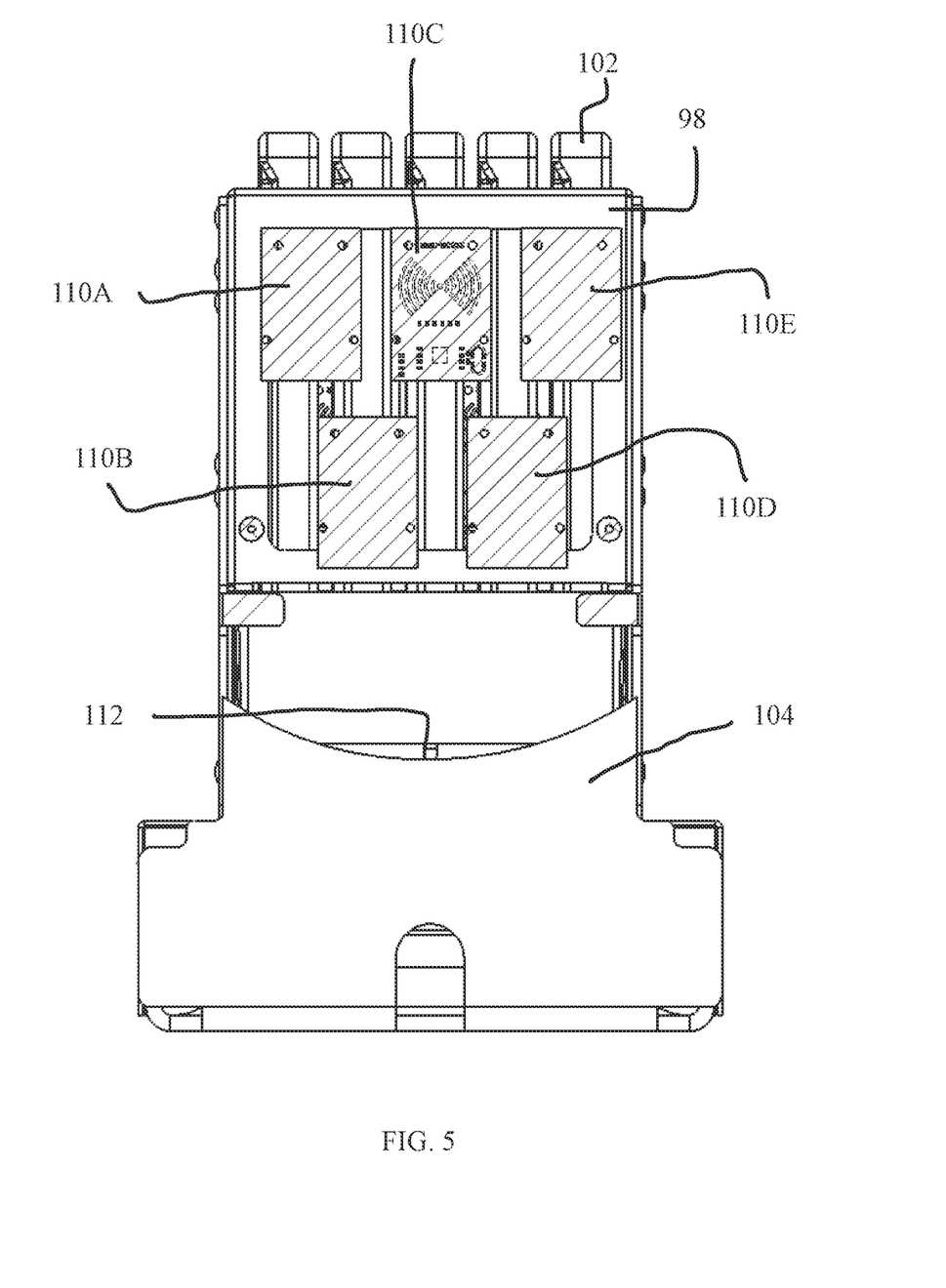
FIG. 5 is a rear sectional view thereof.

FIGS. 4 and 5 show the damage readers 108A-108E, 110A-110E. At least one damage reader 108A-108E, 110A-110E is installed within a base 104 that accepts the device 102. The base 104 provides multiple receiving apertures for receiving the devices 102, such as the tablets. The receiving apertures are separated for storing multiple devices 102, such as the tablets. The walls 96, 98 contain a damage reader. Each damage reader reads the damage detector(s) associated with the device(s).

Damage readers 108A-108E installed in front wall 96 shown in FIG. 4 and damage readers 110A-110E installed in rear wall 98 shown in FIG. 5 read the devices 102. The damage readers 108A-108E, 110A-110E are RFID readers when the damage detectors are RFID tags. In one embodiment, a damage reader is associated with each device installed in the base 104. In another embodiment, at least one damage reader reads the damage detectors of the devices installed in the base 104. A damage reader may be associated with each receiving aperture in the base 104.

Figure 9:
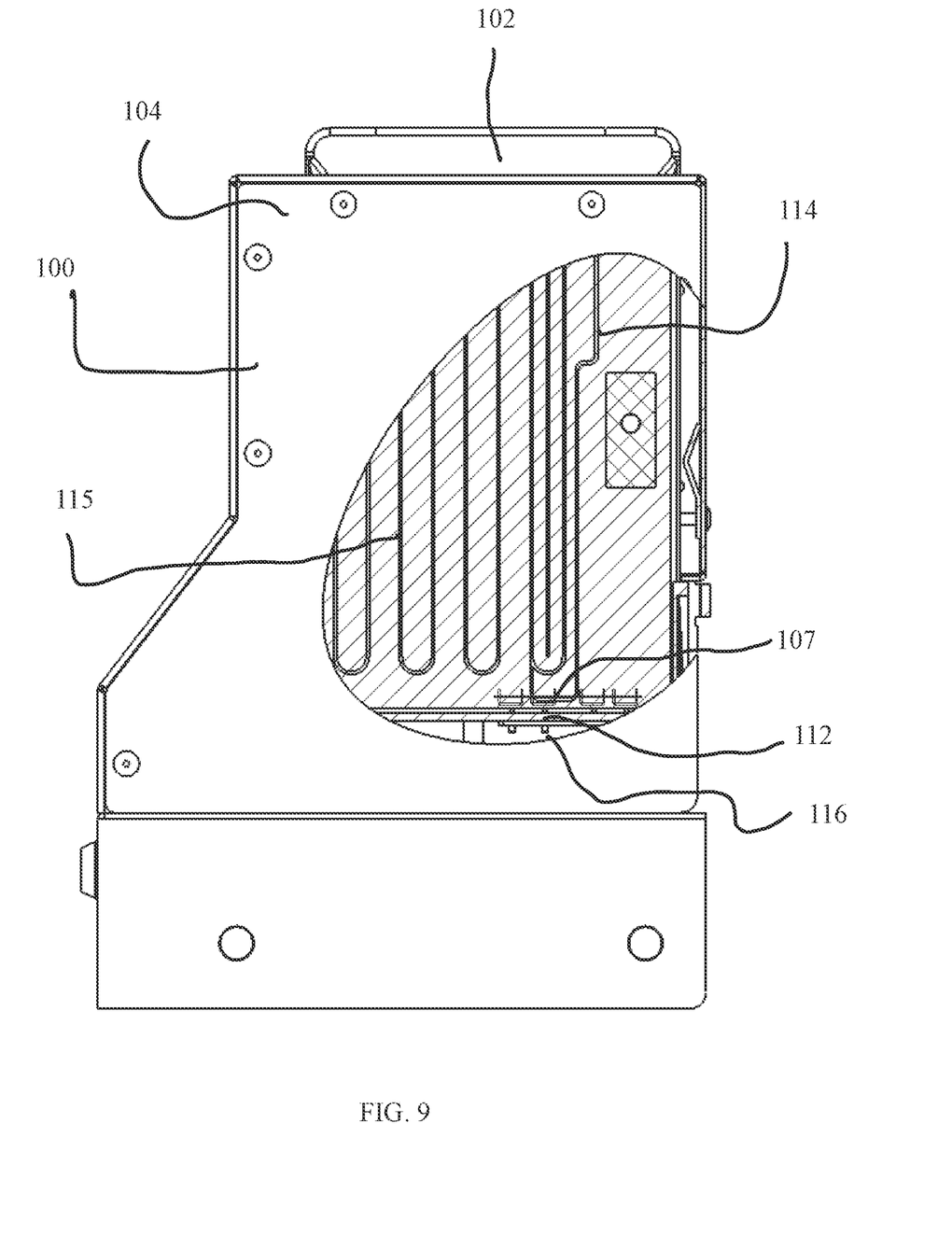
FIG. 9 is a right side sectional view of one embodiment of the present invention.

In one embodiment, the receiving aperture includes data contacts 112 shown in FIGS. 5 and 9. The data contacts 112 enable communication between the base 104 and the electronic device 102. The data contacts 112 communicate with the electronic device 102 to transfer data and identify the electronic device 102.

The base 104 identifies the devices 102 via communication through data contacts 112 or a wireless communication. The base 104 of one embodiment communicates with a server, computer, computing device or other computing system to identify the device 102 via a wired connection or wireless connection.

The server or other computing system communicates with the base 104 to identify the device(s) 102 installed within the base 104. The server or other computing system associates the device 102 with a device identifier and the damage detectors 106A-106F on and/or associated with the device 102. Associating the device 102 with the damage detectors 106A-106F allows the base to identify which damage detectors 106A-106F to detect. The base 104 can then confirm the damage status of the device 102 by reading the damage detectors 106A-106F associated with each electronic device 102 with the damage readers 108A-108E, 110A-110E.

In one embodiment, a data source stored locally on the base or remotely on a server or other computing system stores the associations of the electronic devices, including tablets with the damage detectors, such as RFID tags, secured to the device/tablet. The data source associates the RFID tags with the device/tablet. Such associations instruct the base as to which RFID tags must be read to determine the damage status of the device/tablet. If the RFID readers read all RFID tags associated with the device/tablet, the system identifies the damage status of the device/tablet as undamaged. If the RFID reader cannot read all RFID tags associated with the device/tablet as identified by the data source, the system identifies the damage status of the device/tablet as damaged. The system identifies the damage status of the device/tablet as damaged if the RFID readers (damage readers) misses detecting one or more RFID tags associated with the device/tablet. For example, if RFID readers detect multiple RFID tags associated with the device/tablet but cannot detect (misses) reading one or more of the RFID tags associated with the device/tablet, the system identifies the damage status of the device/tablet as damaged.

If the damage readers 108A-108E, 110A-110E cannot read all damage detectors 106A-106F associated with the device 102, the damage reader indicates that the device 102 is damaged. If the damage readers 108A-108E, 110A-110E read all of the damage detectors 106A-106F, the damage readers 108A-108E, 110A-110E indicate that no damage is detected. The base 104 updates the server or other computing system with the damage status of the device 102 indicating if the device is damaged or not damaged. The server or other computing system can then store the damage status associated with the device 102 and alert others, such as personnel of the damage status of the device 102. The base 104 may also lock the devices 102 having a damage status of damaged.

Figure 6:
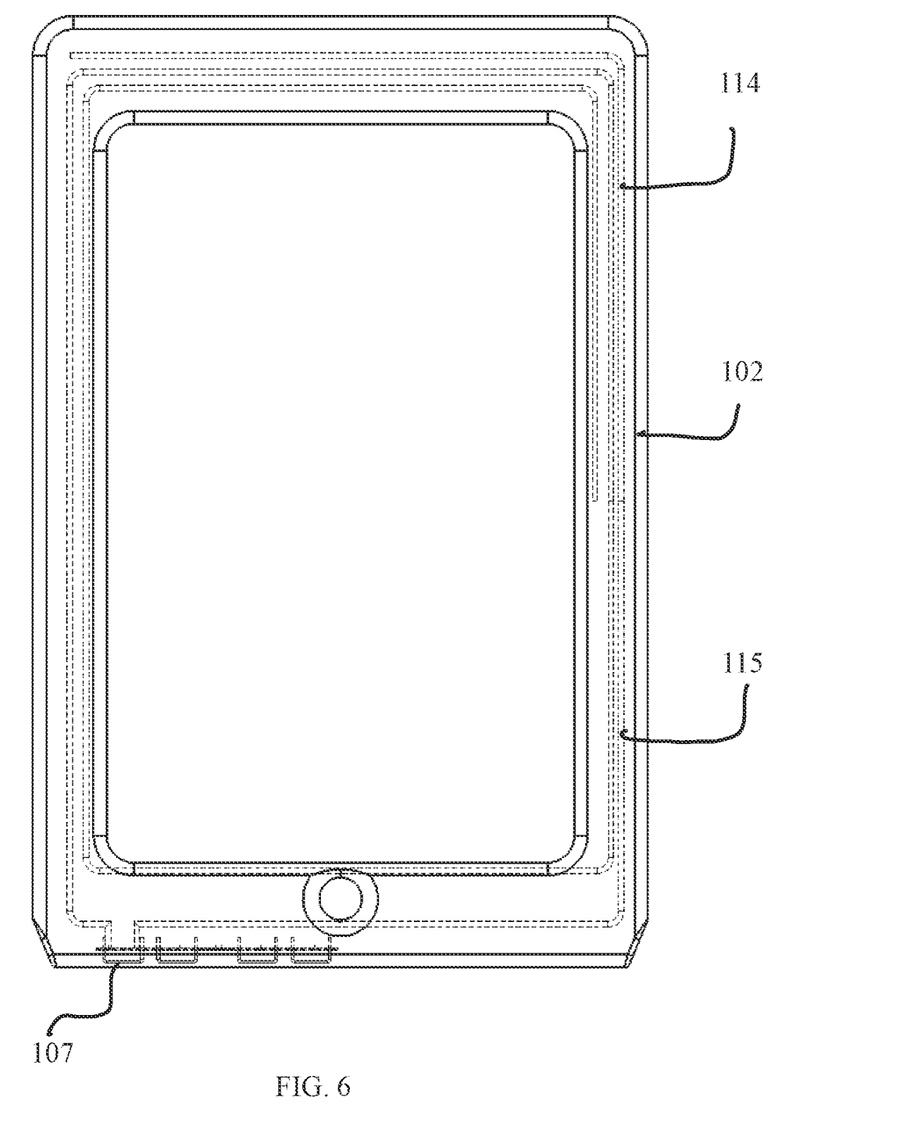
FIG. 6 is a rear sectional view of a tablet of one embodiment of the present invention.
Figure 8:
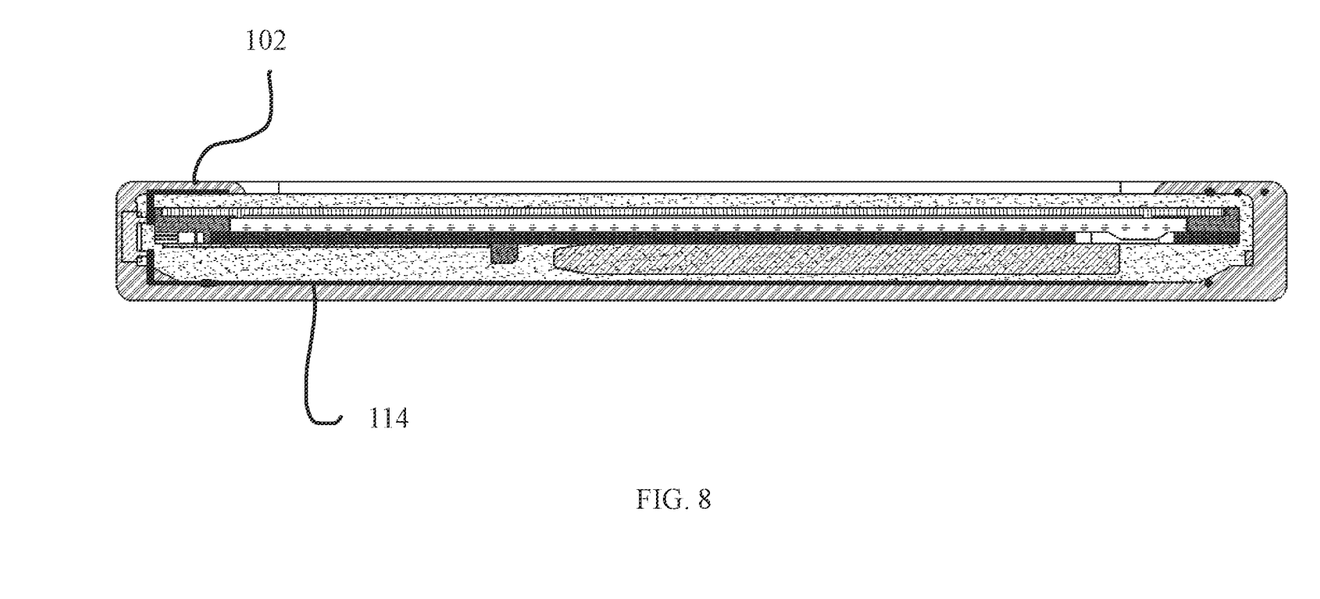
FIG. 8 is a right side sectional view thereof.

FIGS. 6-8 show another embodiment of the damage detector 114 within an electronic device 102, such as a tablet. The damage detector 114 provides a conductor that extends across the electronic device 102 to the data contact 107 to form the detection circuit 115. The detection circuit 115 of the damage detector 114 extends along the front, sides, and rear of the device 102. The detection circuit 115 extends around the device 102 with end points on data contacts 107 to form a complete circuit. A break in the detection circuit 115 indicates potential damage such that the damage reader would indicate damaged as the damage status.

FIG. 9 shows the data contacts 107 of the device 102 contacting the damage reader 116, such as data contacts 112 of the base 104. The damage detector 114 creates a detection circuit 115 between data contacts 107 of the electronic device 102 with the base 104. The data contacts 112 of the base 104 determine if the detection circuit 115 is complete. If the detection circuit 115 is incomplete, the damage reader 116 of the base 104 identifies the incomplete circuit between the data contacts 107 of the electronic device 102. In one embodiment, the data contacts 112 of base 104 identify the short in the detection circuit 115 between the data contacts 107 of the device 102.

The data contacts 112 determine if the detection circuit 115 is broken. If the damage reader 116 does not detect a complete circuit of the detection circuit 115, the damage reader 116 indicates that the device 102 is damaged. If the damage reader 116 detects a complete circuit of the detection circuit 115, the damage reader 116 indicates that the device is not damaged.

The base 104 associates the damage status of the device 102 with the device. Data contacts 107 communicate with the base 104 as described above to determine the device identifier associated with the device 102. The base 104 communicates with the device 102 to determine the identification of the device via data contacts 112. The base may also communicate with the device wirelessly. The base 104 transmits the damage status of the device 102 and the device identifier of the device to the server or other computing system.

The base may also be implemented with a charger for charging the device. The base simplifies the process of charging the devices by removing the need to insert a plug into the electronic device for charging.

The system of one embodiment provides a housing/case for the electronic device and a base designed to receive the housing/case. The charging base is configured to accept the housing in a set orientation. The receiving apertures form a unique shape to allow insertion of the housing into the charging base in an allowed orientation that enables communication between the data contacts and charging contacts. The receiving aperture prevents insertion of the housing/case into the base in a restricted orientation that does not allow communication between the device 102 and the base 104. The allowed orientation also allows charging of the device and communication between the device and the base.

Another embodiment may implement the damage detectors in a case/housing applied to the device 102, such as the tablet. The case/housing inserts into the base 104. A lock, such as a locking finger, locking magnet, locking device, or other locking mechanism, secures the electronic device 102 within base 104. The lock may contact the electronic device or a housing at least partially encasing the electronic device. The lock may contact the device 102 or the case to secure the electronic device 102 within the base 104. In one embodiment, the lock secures the device 102 in the base if the damage status of the device 102 indicates that the device 102 is damaged.

In another embodiment, the lock contacts the device to prevent removal of the device from the base. The lock may be a locking finger that contacts the device. The locking finger adjusts between locked and unlocked. When locked, the locking finger adjusts to a position to block removal of the device/tablet from the base 104. When unlocked, the locking finger adjusts to allow removal of the device from the base. Such a version of the lock enables the lock to function without requiring a locking aperture.

In another embodiment, the base prevents removal of the device. The lock may pivot to prevent removal of the device from the base. The lock pivots between locked and unlocked. When locked, the lock is pivoted to secure the device within the base. When unlocked, the lock pivots to a position to enable removal of the device from the base. The removal of the device depends on the rotation of the lock.

In another embodiment, the lock may be implemented as a latch. The latch secures the device within the base. The latch adjusts between locked and unlocked.

The lock may also be a magnetic lock that adjusts between locked and unlocked. The lock secures the device within the base via the magnet. In one embodiment, the magnet secures the device within the base. The magnet may then be adjusted or deactivated for removal of the device from the base. In another embodiment, the magnet may attract and repel a locking finger for securing the device. The magnet may be an energized electromagnetic that secures the device. De-energizing the magnet enables removal of the device from the base.

The lock may also be a screw lock, twist lock, or hook lock. The screw lock twists into the mated locking aperture of the device or housing. In another embodiment, the screw lock may insert into a hole with the base. With the twist lock, a key inserts into a keyed hole and rotates for alignment with the keyed hole for removal of the device from the base. With the hook lock, a small hook rotates in a mating locking aperture on the device or housing.

Figure 10:
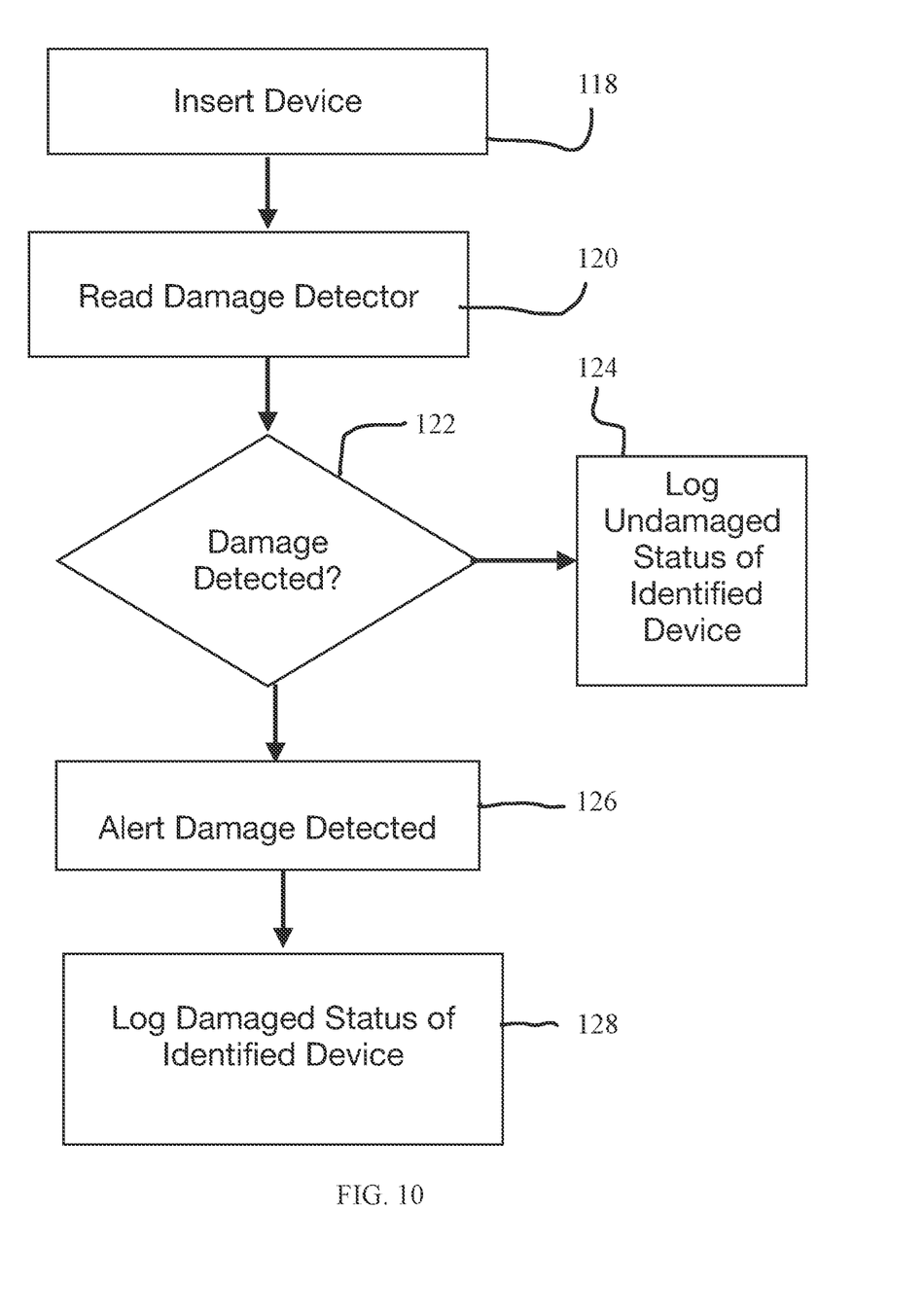
FIG. 10 shows a flow chart showing a process of one embodiment of the present invention.

FIG. 10 shows a method of checking the damage status of a device, such as a tablet. The device inserts into the base, such as a receiving aperture of the base, at Insert Device Step 118. Inserting the device into the base positions the damage detector within a reading distance that allows the damage reader to read the damage detector at Read Damage Detector Step 120.

The damage reader checks the status of the detection circuit by attempting to read RFID tags and/or determining a break in a detection circuit of the damage detector at Damage Detected Query 122 to determine if the detection circuit is complete or incomplete. As discussed above, the damage reader attempts to read the IDs of all RFIDs associated with the device. In one embodiment, the system queries a data source, such as a server, computer, local data source, remote data source, or other source, to identify all RFID tags associated with the device/tablet. If the damage reader cannot read the IDs of all the RFID damage detectors associated with the device, the damage reader indicates that the device is damaged for the damage status. If the damage reader reads all IDs of the RFID damage detectors, the damage reader indicates the damage status as not damaged.

The damage reader of another embodiment determines if a complete circuit exits at the data contacts. If damage reader does not detect a complete circuit, the damage reader indicates the damage status of the device as damaged. If the damage reader detects a complete circuit, the damage reader indicates the damage status as not damaged.

If the device is determined to be damaged at Damage Detected Query 122, the system alerts users, such as personnel or administration that a device is damaged at Alert Damage Detected Step 126. The alert may include a device identifier, date damage detected, user associated with the device during the change of status to damaged, amount of damage detected (number of RFID tags not read and/or percentage of RFID tags read from the total number of RFID tags associated with a tablet), status of the device (communication not working, not charging, etc.) and any other information that may be included. The base 104 of one embodiment secures the device to lock the device with the base to limit access to the device.

The base 104 also communicates with the server to update the damage status of the device at Log Damaged Status Step 128. The base transmits the device identifier and the damage status of the device to the server. The server may then store the damage status associated with the device.

If the device is determined not to be damaged at Damage Detected Query 122, the system indicates that the device is not damaged. The base 104 may transmit the damage status as being undamaged to the server. The server then associates the undamaged status with the device. The server of one embodiment maintains records to identify when a device changes from undamaged to damaged. The server can then identify the user responsible for the device when the damage occurred.

Figure 11:
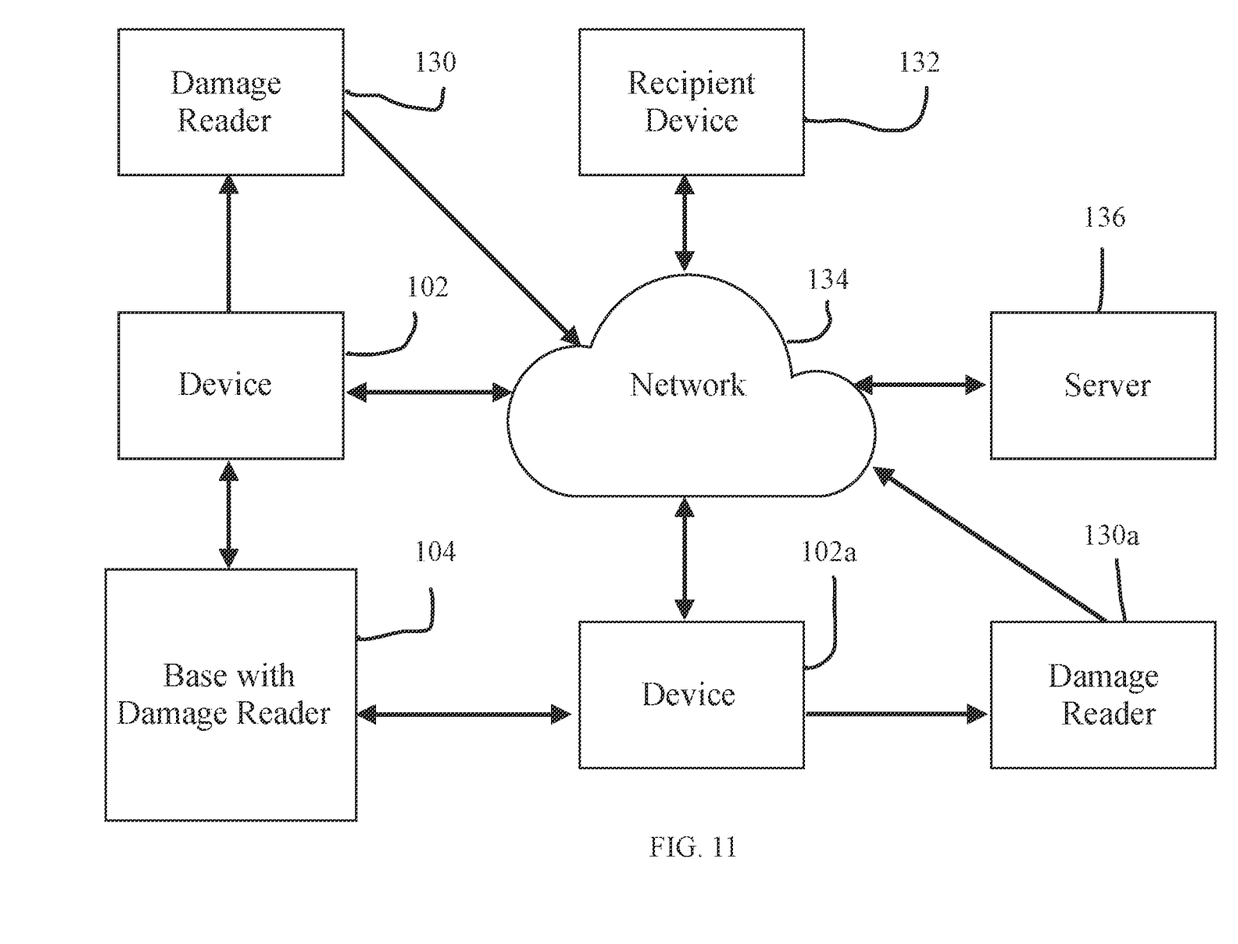
FIG. 11 is an environmental view of one embodiment of the present invention.

FIG. 11 shows another embodiment that provides damage readers 130, 130a that read the status of the damage detectors of devices 102, 102a outside of the base 104. In one embodiment, damage readers 130, 130a, such as RFID readers, are installed throughout the facility in different locations for coverage throughout the facility. One or more damage readers 130, 130a may be installed throughout the facility. These RFID readers check the status of the RFID tags to determine if all RFID tags associated with a device 102, 102a can be found. If the RFID readers cannot find all RFID tags associated with a device 102, 102a, the system indicates that the device 102, 102a is damaged.

The damage readers 130, 130a and base 104 communicate with the devices 102, 102a to read the status of the damage detector(s) on the devices 102, 102a. The damage readers 130, 130a and base 104 communicate with a server 136 through a network 134. The damage readers 130, 130a and base 104 identify those damage detectors of devices 102, 102a that are read.

The server 136 determines which damage detectors should have been read and identifies whether all damage detectors of the devices 102, 102a have been read. The server 136 determines the damage status of the devices 102, 102a by determining if all damage detectors associated with a device are found by damage readers 130, 130a. The server 136 indicates that the device 102, 102a is damaged if not all damage detectors associated with the device 102, 102a are read. The server 136 indicates that the device 102, 102a is not damaged if all damage detectors associated with the device 102, 102a are read.

In another embodiment, the device, such as a tablet, includes a damage detector such as using the processor or a simple circuit detection to determine if the damage detector provides a complete circuit. Upon detecting a broken circuit, the damage reader indicates that the device is damaged.

In one embodiment, the server 136 generates an alert upon determining that a device 102, 102a is damaged. The alert indicates that damage has been detected by at least one of the damage readers 130, 130a or base 104. The alert may be generated by a damage reader 130, 130a or base 104 detecting damage in the base 104 or outside of the base. The server 136 creates an alert identifying that the device 102, 102a, such as a tablet, is damaged. The alert may be an audible alert, such as an alarm, a visual alert, such as a light, or both audible and visual alert. The alert may also be a message, such as an electronic message, an email, a text message, or other message sent to an electronic device, such as a Recipient Device 132. The message of one embodiment includes the device identifier identifying the device, location of the device, the user associated with the device when the damage occurred, and the amount of damage (such as percentage of damage detectors damaged). The server 136 transmits the message to one or more recipient devices 132 of authorized recipients, including, but not limited to, authorized personnel, officers, the owner of the equipment, correctional officers, facility personnel, IT staff, and other approved recipients.

The detection system detects potential damage of tablets without requiring manual inspection. By inspecting the device through reading all RFID tags associated with a tablet or checking the status of a detection circuit that at least partially covers the tablet, the system identifies potential damage of the device/tablet. By detecting a break in a single detection circuit through not reading an RFID tag associated with the device/tablet or identifying a broken circuit secured to the device/tablet, the system labels a tablet as damaged for further review, such as a manual inspection. Such an automatic inspection alerts personnel and/or staff of tablets to be manually inspected.

The system implements a server to store the data and detect the damage status of the devices and detection circuits. The server processes the data identified by the damage readers. The server may include a computing device, computer, or other computing system for processing and storing the data associated with the present invention.

From the foregoing, it will be seen that the present invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A system for detecting potential damage to an electronic device, the system comprising:
    a damage detector secured to the electronic device;
    a base configured to receive the electronic device;
    a damage reader that reads the damage detector to determine a damage status of the electronic device;
    a detection circuit formed by the damage detector, wherein a break in the detection circuit indicates potential damage of the electronic device;
    wherein the damage reader detects if the detection circuit is complete, wherein the damage reader indicates potential damage if the detection circuit is not complete;
    a data contact installed in the base, wherein the data contact is the damage reader, wherein the data contact determines if the detection circuit is complete, wherein the damage reader indicates potential damage if the detection circuit is not complete.

2. A system for detecting potential damage to an electronic device, the system comprising:
    a damage detector secured to the electronic device;
    a base configured to receive the electronic device;
    a damage reader that reads the damage detector to determine a damage status of the electronic device;
    a detection circuit formed by the damage detector, wherein a break in the detection circuit indicates potential damage of the electronic device;
    wherein the damage reader detects if the detection circuit is complete, wherein the damage reader indicates potential damage if the detection circuit is not complete;
    wherein the damage detector is an RFID tag and the detection circuit is an antenna of the RFID tag.

3. The system of claim 2,
    wherein the damage reader is an RFID reader secured within the base.

4. The system of claim 3, wherein the electronic device transmits a device identifier to the base, wherein the RFID tag provides a second device identifier identifying the electronic device.

5. The system of claim 2 further comprising:
    a base configured to receive the electronic device, wherein the damage reader is an RFID reader secured outside of the base.

6. A system for detecting potential damage to a tablet, the system comprising:
    a damage detector secured to the tablet;
    a base configured to receive the tablet;
    a detection circuit of the damage detector wherein a break in the detection circuit indicates potential damage;
    a damage reader that reads the damage detector to determine potential damage of the tablet, wherein the damage reader checks the detection circuit for the break, wherein the damage reader detecting the break indicates potential damage;
    a data contact installed in the base, wherein the data contact is the damage reader, wherein the data contact determines if the detection circuit is complete, wherein the damage reader indicates potential damage if the detection circuit is not complete.

7. A system for detecting potential damage to a tablet, the system comprising:
    a damage detector secured to the tablet;
    a base configured to receive the tablet;
    a detection circuit of the damage detector wherein a break in the detection circuit indicates potential damage;
    a damage reader that reads the damage detector to determine potential damage of the tablet, wherein the damage reader checks the detection circuit for the break, wherein the damage reader detecting the break indicates potential damage;
    wherein the damage detector is an RFID tag and the detection circuit is an antenna of the RFID tag.

8. The system of claim 7,
    wherein the damage reader is an RFID reader secured to the base.

9. The system of claim 7,
    a base configured to receive the electronic device, wherein the damage reader is an RFID reader not secured to the base.

10. The system of claim 9, wherein the RFID tag is associated with the electronic device, wherein the electronic device is identified as damaged if the RFID reader does not read the RFID tag associated with the electronic device.

11. The system of claim 10 further comprising:
    a second RFID tag secured to the electronic device, wherein the second RFID tag is associated with the electronic device,
    wherein the electronic device is identified as damaged if the RFID reader does not read the RFID tag and the second RFID tag associated with the electronic device.

12. A method for detecting damage of a tablet, the method comprising:
    attempting to read a first damage detector on the tablet, wherein the first damage detector forms a detection circuit;
    reading the damage detector to determine if the detection circuit is complete;
    indicating that the tablet is damaged if the detection circuit is broken, indicating that the device is not damaged if the detection circuit is complete;
    identifying a first RFID tag associated with the tablet, wherein the first RFID tag is the first damage detector, wherein an antenna of the first RFID tag is the detection circuit;
    wherein the tablet is associated with an ID of the first RFID tag, wherein an RFID reader reads the first RFID tag to find the ID associated with the tablet;
    indicating that the tablet is damaged if the RFID reader cannot find the ID of the first RFID tag associated with the tablet, indicating that the tablet is not damaged if the first RFID reader finds the ID of the first RFID tag associated with the tablet.

13. The method of claim 12 further comprising:
    attempting to read a second RFID tag secured to the tablet, wherein the second RFID tag is associated with the tablet;
    identifying the second RFID tag associated with the tablet, wherein the second RFID tag has an ID that is associated with the tablet;

wherein the tablet is associated with the ID of the second RFID tag, wherein the RFID reader reads the second RFID tag associated with the tablet;

indicating that the tablet is damaged if the RFID reader cannot find the ID of the first RFID tag and the ID of the second RFID tag associated with the tablet, indicating that the tablet is not damaged if the first RFID reader finds the ID of the first RFID tag and the ID of the second RFID tag associated with the tablet.

* * * * *